United States Patent [19]

McCoy et al.

[11] 4,396,499

[45] Aug. 2, 1983

[54] DEMULSIFICATION OF BITUMEN EMULSIONS USING WATER SOLUBLE SALTS OF POLYMERS

[75] Inventors: David R. McCoy; Michael Cuscurida; George P. Speranza, all of Austin, Tex.

[73] Assignee: Texaco Inc., White Plains, N.Y.

[21] Appl. No.: 326,462

[22] Filed: Dec. 2, 1981

[51] Int. Cl.³ .................... C10G 33/04; B01D 17/00; B01D 19/04
[52] U.S. Cl. .................................. 208/188; 210/108; 210/732; 210/737; 252/358
[58] Field of Search ....................... 208/188; 252/358; 210/708, 732, 737

[56] References Cited

U.S. PATENT DOCUMENTS 3,251,852 5/1966 DeGroote et al. ................. 252/358

*Primary Examiner*—Delbert E. Gantz
*Assistant Examiner*—Helane E. Maull
*Attorney, Agent, or Firm*—Jack H. Park; Kenneth R. Priem; David L. Mossman

[57] ABSTRACT

A process for recovering bitumen from oil-in-water (O/W) emulsions is disclosed wherein water soluble demulsifiers are used. These demulsifiers are water soluble salts of polymers prepared by the reaction between certain polyoxyalkylene diamines with diepoxides. To resolve the bituminous petroleum emulsions, the process is carried out between 25° and 160° C. wherein the demulsifier of the invention is contacted with the bituminous emulsion.

5 Claims, No Drawings

DEMULSIFICATION OF BITUMEN EMULSIONS USING WATER SOLUBLE SALTS OF POLYMERS

BACKGROUND OF THE INVENTION

1. Field of the Invention

This invention is concerned with the breaking or resolution of oil-in-water (O/W) bituminous emulsions by treatment with water soluble polymers.

2. Description of the Related Art

A great volume of hydrocarbons exist in known deposits of tar sands. These deposits occur at various places, the Athabasca tar sands in Canada being an example. The petroleum in a tar sand deposit is an asphaltic bitumen of a highly viscous nature ranging from a liquid to a semisolid. These bituminous hydrocarbons are usually characterized by being very viscous or even non-flowable under reservoir conditions by the application of driving fluid pressure.

Where surface mining is not feasible, the bitumen must be recovered by rendering the tar material mobile in-situ and producing it through a well penetrating the tar sand deposit. These in-situ methods of recovery include thermal, both steam and in-situ combustion and solvent techniques. Where steam or hot water methods are used, a problem results which aggravates the recovery of the bitumen. The difficulty encountered is emulsions produced by the in-situ operations. These emulsions are highly stable O/W emulsions which are made even more stable by the usual presence of clays. Most liquid petroleum emulsions are water-in-oil (W/O) types. These normal W/O emulsions are broken by methods known in the art. However, the bitumen emulsions which are O/W types present a much different problem, and the same demulsifiers used in W/O emulsions will not resolve the O/W bitumen emulsions.

C. W. W. Gewers, *J. Canad. Petrol. Tech.,* 7 (2), 85–90 (1968) describes the uniqueness of emulsions encountered in the production of bitumen from tar sands.

Application Ser. No. 326,458 filed of even date claims adducts of polyoxyalkylene diamines with diisocyanates as tar sand demulsifiers.

Application Ser. No. 326,454 filed of even date claims adducts of polyoxyalkylene diamines with epichlorohydrin as tar sand demulsifiers.

Application Ser. No. 326,459 filed of even date claims ionene polymers (polyquaternary ammonium salts) as tar sand demulsifiers.

SUMMARY OF THE INVENTION

The invention is a method for recovering petroleum from O/W bitumen emulsions by resolving or breaking (demulsifying) these emulsions by contacting the emulsions at a temperature of from between about 25° and 160° C. with water soluble salts of polymers prepared from the reaction of polyoxyalkylene diamines of the structure

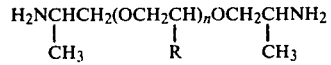

where R=H, $CH_3$ and/or $CH_2CH_3$ with diepoxides of the general structure

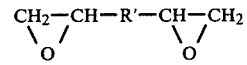

wherein R' is an aromatic or aliphatic group which may optionally contain ether groupings and wherein the polymers are greater than about 2,900 molecular weight and contain greater than about 3.2 meq/g nitrogen.

DESCRIPTION OF THE PREFERRED EMBODIMENTS

The process of this invention utilizing the chemical demulsifier as described above utilizes as a chemical demulsifier a particular water soluble polymer salt.

Useful demulsifiers include water soluble salts of polymers prepared from the reaction of polyoxyalkylene diamines of the structure

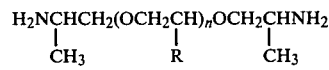

where R=H, $CH_3$, and/or $CH_2CH_3$ with diepoxides of the general structure

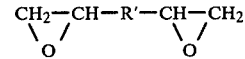

wherein R' is an aromatic or aliphatic group which may optionally contain ether groupings and wherein the polymers are greater than about 2,900 molecular weight and contain greater than about 3.2 meq/g nitrogen.

The reaction between the polyoxyalkylene diamines and the diepoxides above may take place either neat or in inert solvent at temperatures ranging from about 20° to 200° C., preferably 60° to 150° C. The polymers are converted to water soluble salts by adding enough inorganic or organic acid to the polymers to render a 1 wt.% aqueous solution less than pH 8, and preferably less than pH 7.

Particularly preferred polymers are made from the diglycidyl ether of Bisphenol A and either JEFFAMINE® D-230 or JEFFAMINE ED-600. JEFFAMINE D-230 has the structure above for the polyoxyalkylenediamine with R=$CH_3$, n=1.7.

JEFFAMINE ED-600 =
$$O[(CH_2CH_2O)_{4.35}(CH_2CHO)_{0.75}CH_2CHNH_2]_2$$
$$\qquad\qquad\qquad\qquad\quad CH_3\qquad\quad CH_3$$

The produced bitumen emulsions may be treated by the process of our invention in a conventional manner, for example, in a conventional horizontal treater operated, for example, from about 25° to 160° C. and, preferably, from about 50°–150° C. at autogenous pressures. The concentration of the chemical demulsifier described above used in treating the bitumen in water emulsions may range from about 1 to 200 parts per million and, preferably, from about 30 to 150 parts per million with the optional addition of an organic diluent and/or inorganic salt as well as standard flocculants and mechanical or electrical means of demulsification. The following examples describe more fully the present process. However, these examples are given for illustration and are not intended to limit the invention.

EXAMPLE I

JEFFAMINE ED-600+EPON ® 828

Charged a 4 ounce wide mouth container with 50 g JEFFAMINE ED-600

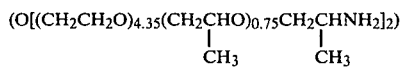

and heated with magnetic stirring to 60° C. Added 20.4 g EPON 828 (diglycidyl ether of Bisphenol A) over 1½ hours, digested for 15 minutes at 100° C., and dissolved product in 200 g $H_2O$ containing enough concentrated hydrochloric acid to render the product solution (with 25% actives) pH 6.8. The polymer was analyzed by liquid chromatography on size-exclusion silica packing modified with quaternary ammonium groups. Average molecular weight was 13,200.

EXAMPLE II

JEFFAMINE ED-900+EPON 828

The method of Example I was used with 50 g of JEFFAMINE ED-900

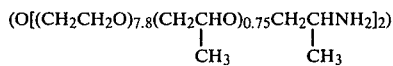

and 27.5 g EPON 828 to prepare a 25% aqueous solution (pH 3.4) of a polymer of 30,000 average molecular weight.

EXAMPLE III

JEFFAMINE D-230+EPON 828

The method of Example I was used at 80°-90° C. addition temperature of 30 g EPON 828 to 50 g JEFFAMINE D-230

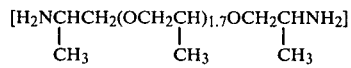

The resulting aqueous solution had a pH of 6.7 and the polymer had an average molecular weight of 6,200.

EXAMPLE IV

A 4 ounce container was charged with 50 g JEFFAMINE M-360 of the structure

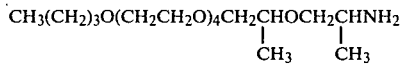

and heated to 90° C. Added 24 g EPON 828 over 15 minutes, digested with stirring at 100°-110° C. for 10 minutes, and poured into 200 g $H_2O$ containing enough concentrated HCl to render the final solution pH 6. The product polymer was shown to have an average molecular weight of 7,600.

EXAMPLE V

Using the general method of Example IV, 15 g of EPON 828 was added over 10 minutes at 100°-120° C. to 50 g of JEFFAMINE ED-600, mixture digested for ½ hour at 110°-120° C., and a pH 7 aqueous solution prepared of the 2,900 molecular product.

EXAMPLE VI

The method of Example V was used with JEFFAMINE ED-900 and 15 g EPON 828 to prepare a pH 6.7 solution of 6,000 molecular weight polymer.

EXAMPLE VII

Addition of 20 g EPON 828 to 50 g JEFFAMINE D-230 at 90°-100° over 5 minutes, digestion for 1 hour at 100°-125° C., and addition to aqueous HCl as before gave a pH 7 solution of 1,800 molecular weight polymer.

EXAMPLE VIII

JEFFAMINE D-230+1,4-BUTANEDIOL DIGLYCIDYL ETHER

A 4 ounce container was charged with 50 g JEFFAMINE D-230, heated to 65° C. with magnetic stirring, and 20 g 1,4-butanediol diglycidyl ether added over ½ hour at 65°-80° C. Mixture was digested at 80°-115° C. for 35 minutes and poured into 200 g $H_2O$ containing 22 g concentrated hydrochloric acid. Additional HCl (8 g) was added to bring pH of solution to 6.9. Product polymer had an average molecular weight of 3,000 by liquid chromatographic analysis.

EXAMPLE IX

Method of Example VIII was used with JEFFAMINE ED-600, and 15 g 1,4-butanediol diglycidyl ether added over 40 minutes at 60°-75° C. followed by digestion for 45 minutes at 75°-110° C. Polymer had an average molecular weight of 5,000.

EXAMPLE X

ADDUCT OF NON-POLYALKOXY DIAMINE

A 4 ounce container was charged with 25 g of 1-cyclohexylamino-2-amino-2-methylpropane

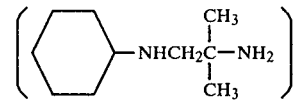

heated to 100° C. and 20 g of 1,4-butanediol diglycidyl ether added over 80 minutes at 100° C. Mixture was heated to 135° C. and held for 1 hour. Product was dissolved in 100 g $H_2O$ containing enough HCl to render the final solution pH 5.8. Polymer had an average molecular weight of 7,300.

EXAMPLE XI

DEMULSIFIER TESTING

The following basic testing procedure was employed:
(a) A 1 wt.% solution (on an amines charged basis where aminopolymers were used, rather than on an amines salts basis) of each chemical was prepared in water.
(b) A 30 ml PYREX ® test tube equipped with screw top was charged with 23 ml emulsion of 11.5 wt.% bitumen content obtained by in-situ steam flooding in tar sand pattern located at Ft. McMurray, Alberta, Canada.
(c) 2 ml of Wizard Lake crude oil was added as diluent and the contents of the test tube were mixed.
(d) The contents of the test tube were equilibrated in an 80° C. oven for 1-2 hours and mixed again.

(e) Chemical was added to the hot, dilute emulsion at the following concentrations: 30, 60, 120 ppm.
(f) Contents of the test tubes were mixed, reequilibrated in an oven at 80° C. for 1 hour and mixed again.
(g) After 20 hours of standing at 80° C., mesurements were made on the volume of top and middle layers, and the appearance of the aqueous phase was noted. Samples of some top layers were carefully removed by pipetting and subjected to Karl-Fischer analysis for determination of the water content. pH measurements were made on the aqueous phases of some broken emulsions to confirm that the addition of even highly acidic demulsifier solutions in the small quantities used have little effect on lowering the pH from the initially observed emulsion pH of 7.8.

Results of testing are summarized in the following table.

Successful examples of demulsification are given using polymers prepared from both polyethyleneoxy and polypropyleneoxy diamines and using both aromatic and aliphatic diepoxides.

Negative examples are also given using non-polyether, non-diprimary amine-derived polymer (XIy, z and a'), polymers with lower than required amine content (XIb, c, o, p), and polymers with lower than required molecular weight (XIm, n, q, r).

For comparison purposes, data are also given for POLYOX WSR-301 poly(ethylene oxide) as demulsifier and systems using no chemical demulsifier.

salts of polymers prepared from the reaction of polyoxyalkylene diamines of the structure

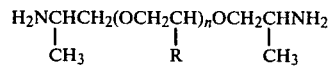

where R=H, CH$_3$, and/or CH$_2$CH$_3$ with diepoxides of the general structure

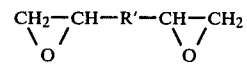

wherein R' is an aromatic or aliphatic group and wherein the polymers are greater than about 2,900 molecular weight and contain greater than about 3.2 meq/g nitrogen.

2. A process as in claim 1 wherein the diepoxide is the diglycidyl ether of Bisphenol A.

3. A process as in claim 1 wherein the polyoxyalkylenediamine has the structure

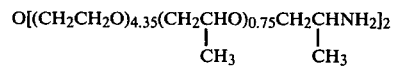

4. A process as in claim 1 wherein the polyoxyalkylenediamine has the structure

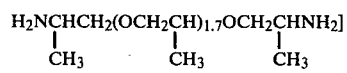

DEMULSIFIER TESTING

| Example XI | Candidate Demulsifier | Concentration (ppm) | Oil Phase Volume in ml. (% H$_2$O) | Emulsion Phase Volume in ml. (% H$_2$O) | Aqueous Phase Appearance |
|---|---|---|---|---|---|
| a | Product of Ex. I | 120 | 5 (4.4) | 1 | Muddy |
| b | Product of Ex. II | 60 | 3 | 2 | Muddy |
| c | Product of Ex. II | 120 | 3 | 1.25 | Muddy |
| d | None | — | 3 | 1.75 | Muddy |
| e | POLYOX WSR-301 | 60 | 6.5 (52) | 0.25 | Yellow, translucent |
| f | POLYOX WSR-301 | 120 | 8 (29) | None | Brown, translucent |
| g | Product of Example III | 120 | 5.5 (20.5) | 0.75 | Light, muddy |
| h | POLYOX WSR-301 | 120 | 5.75 (73) | 0.25 | Muddy |
| i | None | — | 3.5 | 2 | Muddy |
| j | Product of Example IV | 60 | 2.5 | 3.5 | Muddy |
| k | Product of Example IV | 120 | 2.5 | 3.5 | Muddy |
| l | None | — | 2 | 2 | Muddy |
| m | Product of Example V | 60 | 3.5 | 1.5 | Muddy |
| n | Product of Example V | 120 | 3.5 | 1.25 | Muddy |
| o | Product of Example VI | 60 | 4.5 | 1 | Muddy |
| p | Product of Example VI | 120 | 3 | 3.5 | Muddy |
| q | Product of Example VII | 60 | 3 | 3 | Muddy |
| r | Product of Example VII | 120 | 4 | 4 | Muddy |
| s | None | — | 2.4 | 1.75 | Muddy |
| t | Product of Example VIII | 120 | 6.75 (12) | None | Muddy |
| u | Product of Example IX | 60 | 5.5 (28.5) | None | Muddy |
| v | POLYOX WSR-301 | 60 | 7.75 (54) | 0.5 | Yellow, translucent |
| w | POLYOX WSR-301 | 120 | 7.25 (57) | 1.25 | Brown, translucent |
| x | None | — | 4 | 2 | Muddy |
| y | Product of Example X | 30 | 3.5 | 1 | Muddy |
| z | Product of Example X | 60 | 3.5 | 1.25 | Muddy |
| a' | Product of Example X | 120 | 2.5 | 2.5 | Muddy |
| b' | None | — | 2.5 | 2 | Muddy |

Note:
Horizontal lines separate runs made on same day with same emulsion.

We claim:
1. A process for recovering petroleum from O/W bitumen emulsions by demulsifying said emulsions comprising contacting the emulsions at a temperature of from between about 25° and 160° C. with water soluble

5. A process as in claim 1 wherein R' additionally contains ether groupings.

* * * * *